Figure 1:
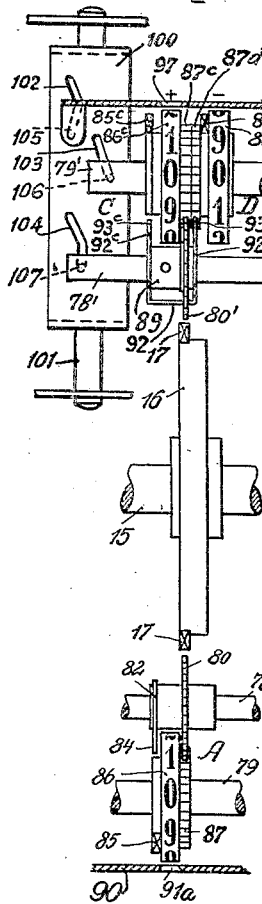

June 8, 1937.  E. MODES ET AL  2,083,200
CALCULATING MACHINE
Filed May 23, 1929    5 Sheets-Sheet 1

Inventors:
Ernst Modes,
Otto Hennig and
Richard Honz
by Kunhaus
Atty.

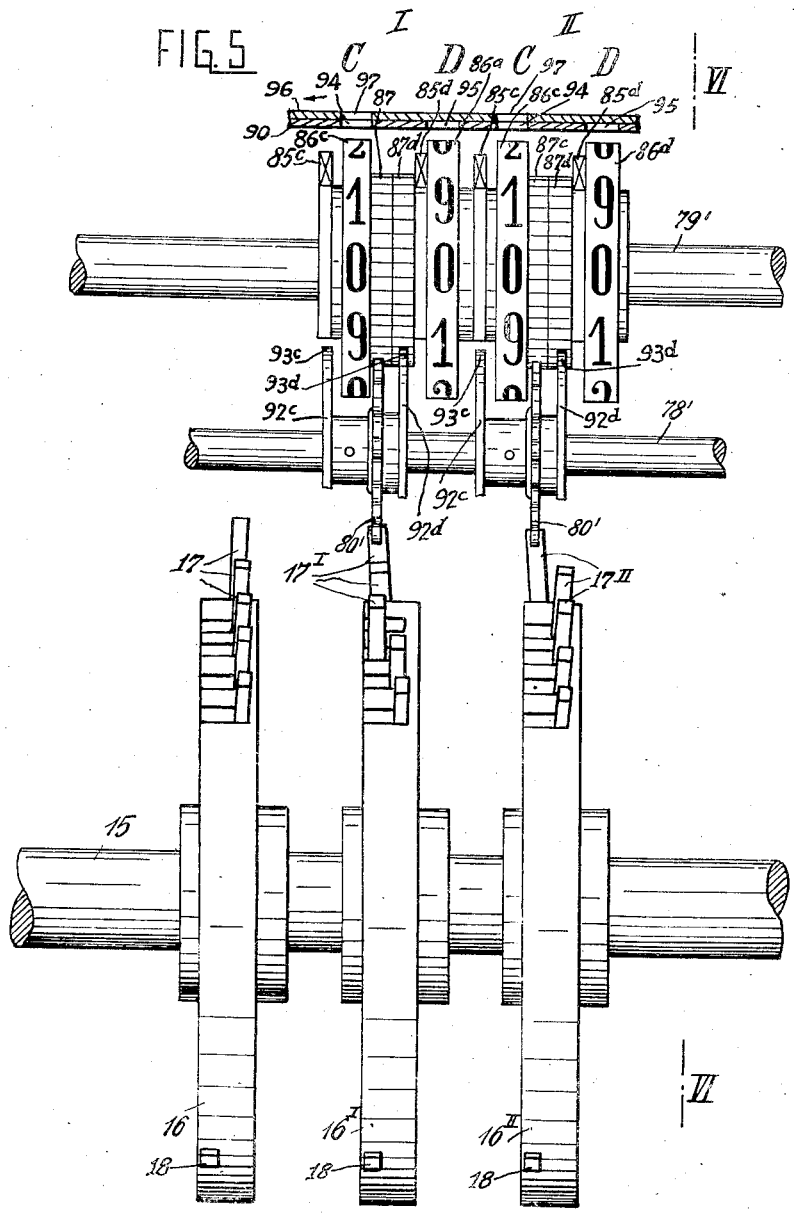

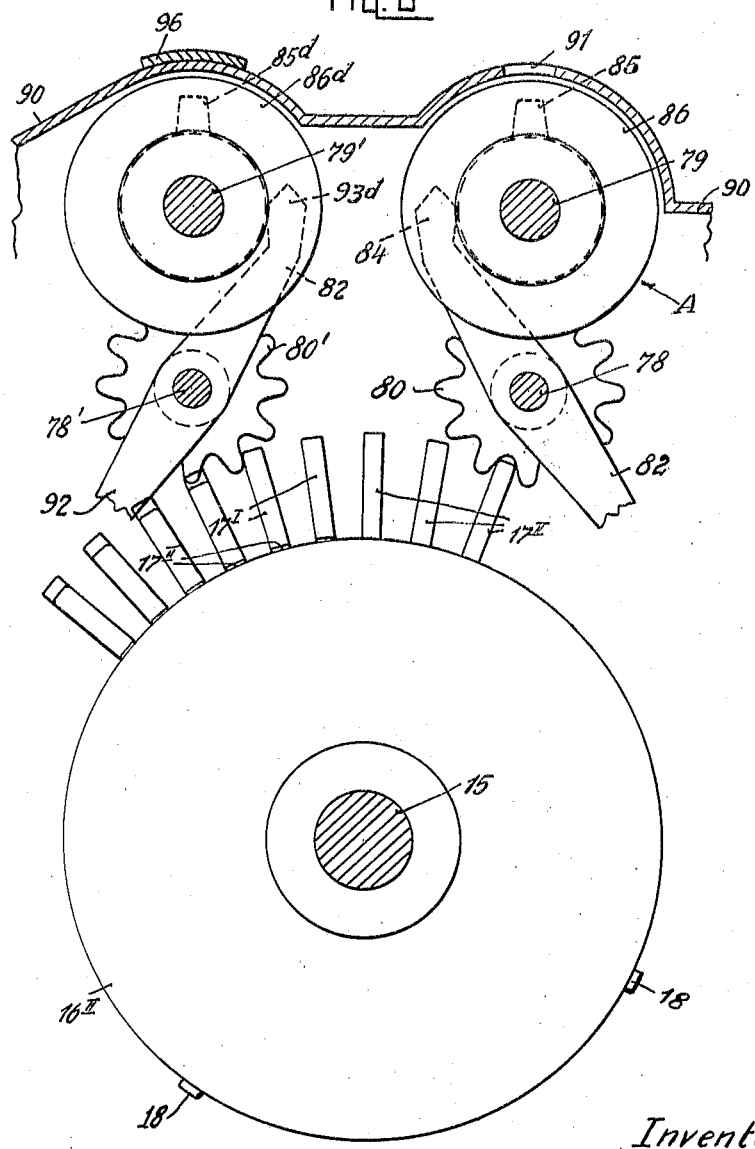

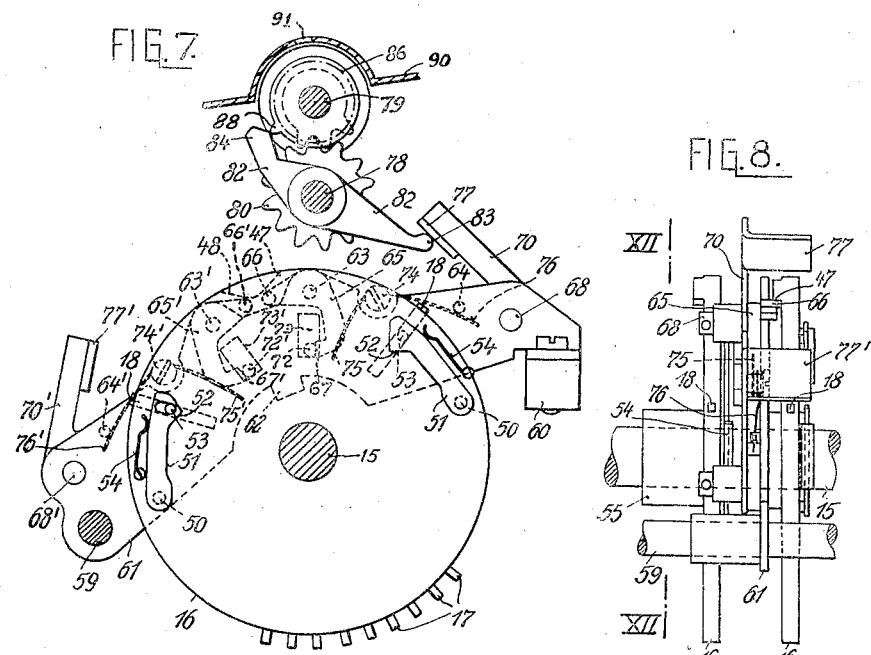
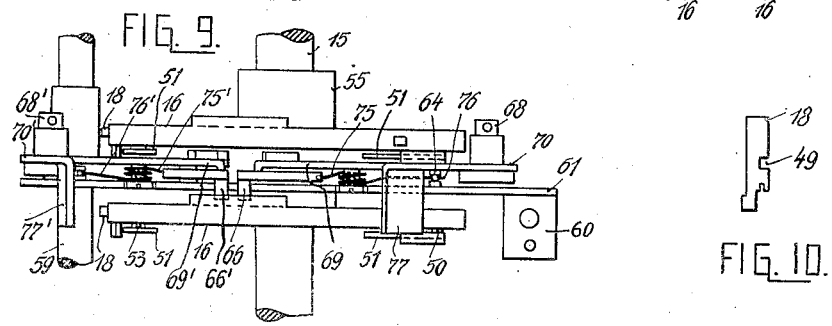
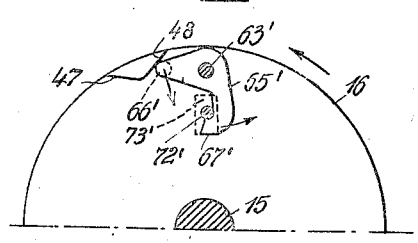

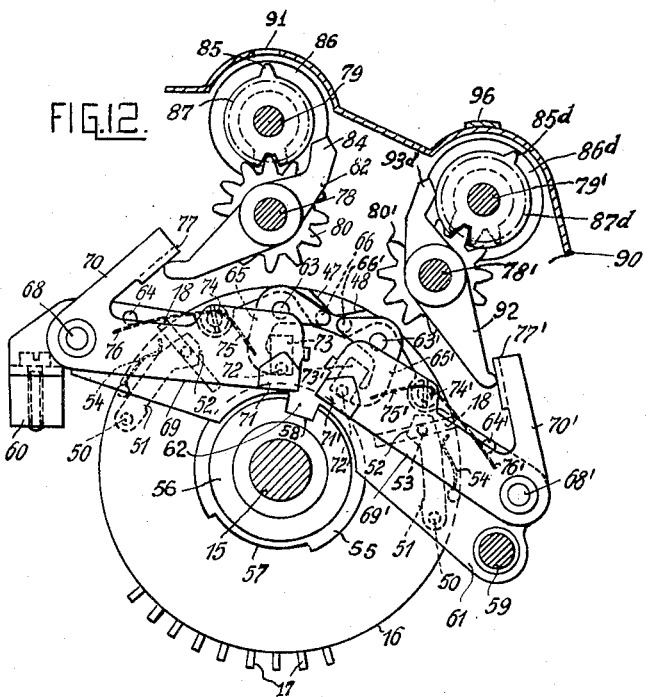

Patented June 8, 1937

2,083,200

UNITED STATES PATENT OFFICE 2,083,200

CALCULATING MACHINE

Ernst Modes, Leipzig, Richard Honz, Leipzig-Eutritzsch, and Otto Hennig, Leipzig-Neustadt, Germany, assignors to the firm Triumphator-Werk m. b. H., Leipzig-Molkau, Germany Application May 23, 1929, Serial No. 365,409
In Germany February 14, 1927

2 Claims. (Cl. 235—79)

Our invention relates to key-set calculating machines, and more particularly to a machine of the type referred to in which calculating units are provided. It is an object of our invention to improve a machine of this type with a view to rendering it more adaptable.

To this end, we equip the calculating units, in addition to the normal accumulator which will be referred to as the "principal" accumulator, and to a calculating wheel of the usual design, with another accumulator which will be referred to as the "subsidiary" accumulator. The principal accumulator may have more than one registering wheel while the subsidiary accumulator has a pair of independently rotatable registering wheels. One of the registering wheels in the subsidiary accumulator is numbered in the same sequence as the registering wheel, or one of the registering wheels, in the principal accumulator, and the other registering wheel in the subsidiary accumulator is numbered in the opposite sequence. The calculating wheels of the individual units are equipped with the usual nine teeth for rotating the registering wheels in the principal and subsidiary accumulators, and means such as an axially shiftable shaft, or a pair of shafts, on which the parts of the subsidiary accumulator are mounted, are provided for alternately connecting one of the registering wheels in the subsidiary accumulator to the calculating wheel of the unit, and for disconnecting both registering wheels of the subsidiary accumulator from the calculating wheel.

By providing a unit having a principal and a subsidiary accumulator as described, with not less than three registering wheels in all, the adaptability of the machine is much increased as compared with the usual machine whose calculating units have a single accumulator and a single registering wheel only. For instance, calculations may be performed with our novel units in which positive and negative amounts are accumulated separately, or in which such amounts are temporarily involved in, and cut out from, the calculating operation. It is also possible to form positive or negative individual products which are simultaneously added or subtracted, and all normal calculations may also be performed, as will be fully described below.

In the drawings affixed to the specification and forming part thereof, two types of calculating units embodying our invention are illustrated diagrammatically by way of example.

In the drawings

Figure 2:
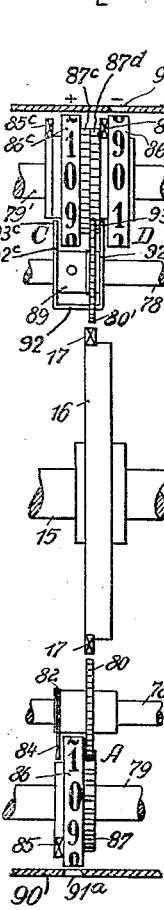
Figure 3:
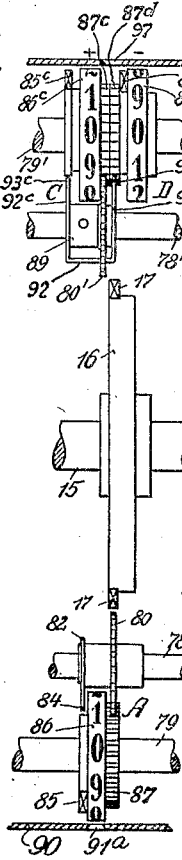
Figure 4:
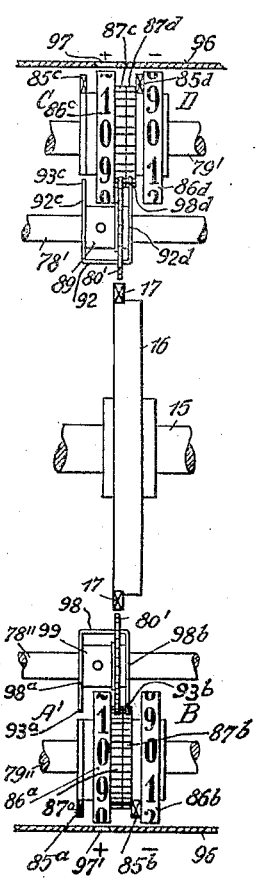

Figs. 1, 2 and 3 are views illustrating, in three positions of its parts, a calculating unit with a single registering wheel in the principal accumulator and two registering wheels in the subsidiary accumulator, the two accumulators being shown at opposite sides of the calculating wheel for the sake of clearness, Fig. 4 is a view showing, in the position of parts illustrated in Fig. 1, a calculating unit with two registering wheels in the principal accumulator, Fig. 5 is an elevation, on a magnified scale, of two subsidiary accumulators, the individual parts being shown in a position corresponding to Fig. 1, Fig. 6 is a section on the line VI—VI in Fig. 5, Figs. 7 to 13 illustrate the tens-transfer structure, as follows:

Fig. 7 is an elevation of a calculating wheel with one of the calculating units only cooperating therewith and the parts supporting it on the frame, Fig. 8 is an end elevation of the structure, viewed from the left in Fig. 7, Fig. 9 is a plan view of the structure, Fig. 10 shows one of the transfer teeth, Fig. 11 shows diagrammatically one phase of the operation of the structure, the view being taken from the side opposite to that from which Fig. 5 is seen, Fig. 12 is a view similar to Fig. 7, also taken from the side opposite to that from which Fig. 7 is seen, and shows two calculating units in combination with a calculating wheel, and Fig. 13 is an elevation of a bridge on which certain parts of the structure are supported, and of a calculating wheel.

The details of the machine have not been illustrated, only a portion of the casing 90 on the carriage being shown in Figs. 6, 7 and 12. The main driving shaft 15 supports the calculating wheels 16 for the individual units. The calculating wheels 16, $16^I$ and $16^{II}$ are illustrated in Fig. 5, together with the subsidiary accumulators of the units I and II to which belong the calculating wheels $16^I$ and $16^{II}$, respectively. The calculating wheels are equipped with nine teeth 17 which are moved into and out of active position with respect to the units by the keys of the calculating machine, and two tens transfer teeth 18. The means for moving the teeth 17 have not been illustrated as they form no part of the present invention. The means for moving the teeth 18 will be described with reference to Figs. 7 to 13.

In Figs. 1 to 4, the two accumulators are shown as placed apart so that they appear at opposite sides of the calculating wheel 16 while in fact they are above it, as shown in Fig. 6.

The principal accumulator A is supported on a pair of parallel shafts 78 and 79, Figs. 1 to 3, and the subsidiary accumulator C, D is supported on a similar pair of shafts 78', 79', which also extend in parallel relation to each other. The shafts of both pairs extend in parallel relation to the main driving shaft 15. The shafts 78' and 79' of the subsidiary accumulator are adapted to be shifted axially in the carriage by any suitable means such as for instance the device shown in Fig. 1. As may be seen from this figure a slide 100 is shiftably mounted upon a shaft 101 and provided with slots 102, 103 and 104 of different form. Pins 105, 106 and 107 connected to a slide 96, the shaft 79' and the shaft 78' respectively extend through the corresponding slots 102, 103 and 104 respectively. The middle slot 103 is formed as a straight slot extending obliquely to the longitudinal axis of the slide 100. The slot 102 is angularly shaped. Its lower half is inclined in a direction opposite to that of the slot 103, while its upper half runs in parallel to the middle slot 103. The slot 104 also is formed angularly. Its lower half extends parallelly to the longitudinal axis of the slide 100, whereas the upper half extends parallelly to the middle slot 103.

Fig. 1 shows the slide 100 in its uppermost position which corresponds to the one end position of the shafts 78', 79' and the slide 96. If the slide 100 is partly moved downwardly, the shaft 78' remains in its position, because the lower half of the angularly shaped slot 104 extends in parallel to the longitudinal axis of the slide 100 and therefore cannot shift the pin 107 connected to shaft 78'. During this movement of the slide 100, the shaft 79' and the slide 96 are shifted in opposite directions, as the pins 106 and 105 connected to the shaft 79' and the slide 96 respectively are influenced by portions of the slots 103 and 102 respectively which are in opposite directions inclined to the longitudinal axis of the slide 100. The position of the individual parts of the machine, due to this shifting movement of the slide 100, is illustrated in Fig. 2 and may be called an intermediate position. If now the slide 100 is moved further in the same direction into its lowermost position, the shaft 78' and 79' and the slide 96 all are shifted in the same direction, as the portions of the slots 102, 103 and 104, effecting this movement, all are inclined in the same direction with regard to the longitudinal axis of the slide 100. Fig. 3 shows the position occupied by the individual parts of the machine at the end of the downward stroke of the slide 100. In the unit illustrated in Figs. 1 to 3, the shafts 78 and 79 of the principal accumulator A are fixed against axial displacement.

Mounted on the shaft 78 of the principal accumulator A are intermediate wheels or spur gears 80 and tens-transfer levers 82 (Figs. 1-3 and 6), each tens-transfer lever being provided with a cam 84 at one end. The shaft 79 carries the registering wheels 86 and the spur gears 87 of the principal accumulators A in the several units. Every registering wheel 86 bears a disk with a projection 85. The cams 84 at one end of the transfer levers 82 are adapted to be controlled by the projections 85 of the corresponding registering wheels in the several calculating units, while with their opposite ends the transfer levers control mechanisms will be described with reference to Figs. 7 to 13. Above the registering wheels 86 inspection holes 91 are provided in the casing 90, as best seen in Fig. 6.

The shaft 78' of the subsidiary accumulator which subsidiary accumulator is subdivided into the individual registering devices C, D carries intermediate wheels or spur gears 80' which are free to rotate on the shaft but are held against displacement thereon by collars 89 so that they partake in the shifting movement of the shaft 78'. The tens-transfer levers of the subsidiary registering devices C, D which as a whole are designated with 92 are U-shaped and mounted to rock on the shaft 78' while being held against axial displacement by the collars 89. The shanks 92c and 92d of the levers 92 are equipped with cams 93c and 93d for cooperation, respectively, with projections 85c and 85d on disks carried, respectively, by the registering wheels 86c and 86d of the subsidiary accumulator, as best seen in Fig. 5. This figure shows two subsidiary registering devices C, D for the units I and II, and the two calculating wheels $16^I$ and $16^{II}$ with their teeth $17^I$ and $17^{II}$ for the respective units. The shaft 79' is also mounted to be shifted axially. Spur gears 87c and 87d which are connected to the registering wheels 86c, 86d, respectively, and adapted to be rotated by the intermediate gears 80' are arranged side by side.

The registering wheels 86c of the subsidiary registering devices C, D are numbered in the same sequence as the registering wheels 86 of the principal accumulators A and are used for addition, while the registering wheels 86d are numbered in the opposite sequence and are used for subtraction. Preferably the numbers of the wheels 86 and 86c are of a different colour from that of the numbers of the wheel 86d, 94 and 95 (Fig. 5) are two slots in the casing 90 for each of the devices C, D which slots expose both registering wheels 86c, 86d devices of C and D of the subsidiary accumulator, and 96 is a slide, with an inspection hole 97 for each accumulator which is mounted to move on the casing 90, so that the hole 97 may be brought into register with the corresponding inspection holes 94 or 95. The slide 96 may be shifted to an intermediate position, shown in Fig. 3, so as to cover all the inspection holes 94 and 95 and to conceal the numbers of the wheels 86c and 86d.

The clearing device for the registering wheels 86, 86c and 86d will be described with reference to Figs. 7 to 13. The means for zeroizing the accumulators are old in the art and have not been illustrated.

The principal accumulator A of the units order includes a single registering wheel 86. The first registering device C of the subsidiary accumulator comprises the registering wheel 86c, the projection 85c and the spur gear 87c. The second registering device D of the subsidiary accumulator which is mounted on the same shaft as the first registering device C comprises the registering wheel 86d, the spur gear 87d and the projection 85d. In the position illustrated in Fig. 1, the inspection hole 97 of the slide 96 coincides with the inspection hole 94 of the casing 90, not shown here, so that through these holes the registering wheel 86c of the device C, for addition is visible and in the position illustrated in Fig. 2 in which the slide 96 has been shifted to the right the registering wheel 86d of the device D, for subtraction is visible through the inspection hole 97 of the slide 96 and the inspection hole 95 of the casing 90, not shown. If the shafts 78', 79' are moved toward the left and if the inspection hole 97 is brought into the central position as shown in Fig. 3, neither of the registering wheels 86c, 86d is exposed, but the registering wheel 86 of the principal accumulator A is still exposed through the permanently open hole 91 and the machine is operated like a normal calculating machine.

In the position illustrated in Figs. 1 and 5, the shafts 78' and 79' and the slide 96 occupy the one end position and the intermediate gear 80' in the subsidiary accumuatorlator C, D is in position to be engaged by the teeth 17 of the corresponding calculating wheel 16. It is understood that in fact the teeth 17 on the calculating wheel 16 mesh with the wheels 80 and 80' but they have been shown a slight distance away from the wheels for the sake of clearness. The shank 92c of the tens-transfer lever 92 which has the cam 93c, is in line with the projection 85c of the first registering device C, but the other shank 92d which has the cam 93d, is not in line with the projection 85 of the second registering device D. The inspection hole 97 of the slide 96 is above the registering wheel 86c and the intermediate wheel 80' meshes with the spur gear 87c. The operation which will be performed, is addition, as indicated by the "+" sign above the hole 97, and the direction in which the slide 96 and the shafts 78' and 79' have been shifted, is indicated by the respective arrows.

According to Fig. 2, the shaft 79' together with the registering wheels 86c and 86d mounted thereon has been shifted to the left. The slide 96 has been moved to the right as indicated by its arrow, to bring the hole 97 in line with the registering wheel 86d of the device D. The intermediate wheel 80' now meshes with the spur gear 87d of the registering wheel 86d, whose projection 85d is now in line with the cam 93d of the tens-transfer lever 92 while the cam 93c is clear of the projection 85c. The operation which will now be performed, is subtraction, as indicated by the "—" sign above the hole 97. The position of the shaft 78' has for this operation not been altered.

In the position shown in Fig. 3, not only the shaft 79' has received an additional movement to the left, but also the shaft 78' has been moved to the left so that the wheel 80' engages the wheel 87c and the teeth 17 of the calculating wheel 16 cannot rotate the intermediate wheel 80', i. e. the subsidiary accumulator C, D is cut out altogether. In this position the slide 96 has been shifted to the left, as indicated by the arrow, and assumes an intermediate position in which none of the wheels 86c and 86d is visible (see Fig. 3).

Referring now to Fig. 4, the subsidiary accumulator C, D is of the same design as in Figs. 1–3. The parts 85a, 86a and 87a of the principal accumulator A' correspond to the parts 85, 86 and 87 respectively of the principal accumulator A in Figs. 1–3. In the principal accumulator A', however, a second registering device B including a registering wheel 86b with a projection 85b and a spur gear 87b is arranged at the side of the registering wheel 86a on the shaft 79'', and shafts 78'' and 79'' are mounted to be shifted axially, like the shaft 78' and 79' of the subsidiary accumulator and by means similar to those shown in Fig. 1. A U-shaped tens-transfer lever 98, having shanks 98a and 98b, which is exactly similar to the U-shaped tens-transfer lever 92 of the subsidiary accumulator C, D, is mounted to rock on the shaft 78'' and held against axial displacement by a collar 99. Its cams 93a and 93b cooperate with the projections 85a of the device A' and 85b of the device B, respectively. The numbering of the registering wheels 86a, 86c and 86d is as described with reference to the wheels 86, 86c and 86d respectively of Figs. 1–3 and the numbering of the wheel 86b corresponds to that of the wheel 86d in the subsidiary accumulator D. Opposite the accumulators A', B inspection holes 94 and 95, such as shown in Fig. 5, are provided in the casing 90 with which the slide 96, having holes 97, cooperates. The slide 96 in this case has, besides the row of holes 97 for cooperation with the holes 94, 95 opposite the devices C, D, an additional row of holes 97' for cooperation with the holes 94, 95 opposite the devices A' and B.

In operation, when the parts are in the position illustrated in Fig. 4, with the holes 97' and 97 in the slide 96 exposing the registering wheels 86a and 86c of the principal accumulator A' and the subsidiary accumulator C, a total, for instance, of amounts received, may be read at device A'. The final products are calculated by the cooperation of devices A' and C. The zeroizing of the subsidiary accumulator is obtained in a manner to be described presently, whereby the products, calculated in this device C, are automatically transferred into the device A'. Now, the shafts 79'' and 79' are shifted so that the device B in the principal accumulator cooperates with the device D of the subsidiary accumulator and another total, for instance, of amounts spent, is added at device B. The totals received and spent are now read side by side at devices A' and B by suitably shifting the slide 96.

The tens transfer structure will now be described with reference to Figs. 7 to 13.

As mentioned, each calculating wheel has a pair of tens transfer teeth 18 (Figs. 5–10, 12 and 13). One of the teeth is shown in Fig. 10. Each of the teeth 18 is operatively connected to a control lever 51, fulcrumed on each wheel 16 at 50 and equipped with a pin 53 for engaging in a notch 49 (Fig. 10) of the corresponding tens transfer tooth 18. The control levers 51 each have a cam face 52 at the free end, and a spring 54 tends to move each of the teeth 18 toward the shaft 15 of the calculating wheels through control levers 51, and pins 53.

The tens transfer structure is mounted on two bars 59 and 60 which are mounted in the casing 90 at opposite sides of the calculating wheels 16.

A bridge 61 which is best shown in Fig. 13, is supported by the bars 59 and 60. It should be borne in mind that Figs. 7 and 12 are views taken from opposite sides.

The bridge 61 has a central recess from which projects a tooth 62 and is equipped with a pin 64 and a pivot 63 at that side which is near the bar 60, and with similar members 63' and 64' at that side which is near the bar 59. A pivot 68 is arranged on the bridge in the vicinity of the bar 60, and another pivot 68' is arranged in the vicinity of the bar 59. A bell-crank lever 65 is mounted to turn about the pivot 63, and a similar bell-crank lever 65' is mounted to turn about the pivot 63'. The bell-crank levers 65 and 65' have a pin 66 and 66' respectively at the end of its shorter arm, and a hook 67 and 67' respectively at the end of its longer arm, as best seen for the bell-crank lever 65' in Fig. 11. The hooks 67 and 67' of the two bell-crank levers 65 and 65' partly cover holes 73 and 73' respectively in the bridge 61, as also shown in Fig. 11.

A lever 69 with an extension 70 and a plate 71 at the free end of the extension is mounted on the pivot 68, as shown in Fig. 12, and a similar lever 69', with an extension 70' and a plate 77' at the free end of its extension, is mounted on the pivot 68'. At their free inner ends, the levers 69 and 69' are equipped with a pin 72 and a V-shaped projection 71, and a pin 72' and a projection 71', respectively. The pin 72 projects through the hole 73 in the bridge 61 for cooperation with the hook 67 of bell-crank lever 65, and the pin 72' is similarly related to the hook 67' of the other bell-crank lever 65'. A screw 74 on the lever 69 supports a spring whose end 76 bears against the pin 64 on the bridge 61 while its other end 75 bears against the longer arm of bell-crank lever 65. A second spring, with ends 75' and 76' is secured on a screw 74' of the other lever 69', its end 75' bearing against the longer arm of bell-crank lever 65'. A camming member with camming faces 47 and 48, is formed on one face of each calculating wheel 16 for cooperation with the corresponding bell-crank levers 65 and 65', as best seen in Fig. 11.

If upon rotation of the corresponding calculating wheel 16 one of the registering wheels, say, one of the wheels 86d on the shaft 79', moves from "9" to "0", or vice versa, the tooth 85d which corresponds to this wheel, moves the cam 93d of lever 92 away from the shaft 79' and the free end of the lever 92 engages the plate 77' at the extension 70' of lever 69'. This causes the lever 69' to swing upwards until its pin 72' is engaged by the hook 67' of bell-crank lever 65', as best seen in Fig. 11. When the setting wheel 16 is rotated further in anti-clockwise direction, as viewed in Fig. 12, the cam face 52 at the free end of that control lever 51 which is at the right in Fig. 12, rises on the slope of the face at the right of projection 71'. This causes the control lever 51 to be turned about its fulcrum at 50 and its pin 53, through notch 49, to advance the corresponding tens transfer tooth 18 which is of the next higher decimal order, so that it moves the intermediate gear 80' on the shaft 78' for one tooth, and the registering wheel 86d on the shaft 79' for the next decimal. When the tens transfer has been effected and the calculating wheel is rotated further in the same direction, the cam face 52 at the free end of the corresponding control lever 51 slides off the projection 71' altogether, and the transfer tooth 18 is retracted by the spring 54 through the pin 53. A short time before the crank or other means (not shown) for operating the machine arrives in its final position, the face 48 of the camming member on the calculating wheel 16 engages the pin 66' at the short arm of bell-crank lever 65', as shown in Fig. 11 in which, as the calculating wheel 16 is viewed in the direction opposite to that in Fig. 7 but in the same direction as in Fig. 12, the rotation of the wheel 16, as indicated by the arrow, is anticlockwise. The hook 67' of the lever 65' now releases the pin 72' and the lever 69' is returned into its initial position by the spring end 76' (Fig. 12). The bell-crank lever 65 is operated in a similar manner by the cam face 47.

Referring now to Fig. 13, it will appear that the tooth 62 of the bridge 61 engages in a notch of a ring 56 which is fixed to the boss 55 of the corresponding calculating wheel 16 so that, during rotation of the latter, the boss 55 as well as the ring 56 are arrested by the tooth 62. The teeth 17 are mounted to oscillate about a curved shaft 118 on the calculating wheel 16 and the inner ends of the teeth move into, and out of, an elongated notch 57 in the boss 55 as they are oscillated about the shaft 118 by means which may include a slide (not shown) and sectors on the slide for oscillating the teeth 17 as the slide is reciprocated.

Some examples of the operation of the machine will now be described.

1. If it is desired to take several products and to add same, the parts occupy the operative position shown in Figs. 1 and 5, the shaft 79' to the right as indicated by the arrow, while shaft 78' remains in its position, so that the spur gear 87c of the registering wheel 86c meshes with the intermediate wheel 80', and the slide 96 is shifted to the left, as indicated by its arrow, so that its hole 97 exposes the numerals on the registering wheel 86c.

This is an adding operation, as indicated by the "+" sign above the hole 97. The main driving shaft 15 is rotated in forward direction, and its calculating wheels 16, through teeth 17 and intermediate wheels 80', gearing with the toothed wheels 87c connected to the registering wheels 86c, operate the wheels registering 86c. At the same time, the calculating wheels 16, through the intermediate wheels 80, gearing with the toothed wheels 87 connected to the registering wheels 86, operate the principal accumulators A, so that the registering wheels 86c and 86 in the first registering device C of the subsidiary accumulator, and in the principal accumulator A, rotate in the same direction. When the first product has been taken and read in the hole 97, the registering wheel 86c is zeroized. The next product is now taken in the same manner, and added to the first product in the principal accumulator A where the total is read in the hole 91. In this manner, the individual products are taken in the subsidiary accumulator, and added in the principal accumulator.

If it is desired to add all the products or other items in a first operation, and then in a second operation, to perform the same addition but to omit certain products, or items, the first operation is performed as described, by means of the registering wheels 86c and 86. In the second operation, the subsidiary accumulators C, D are shifted to the left, as shown in Fig. 3, for every product or item which is to be omitted, so that the subsidiary accumulator becomes inactive for the omitted products or items. The respective totals are read from A and C.

2. If it is desired to subtract several products from a given amount, the shaft 79' is shifted to the left, Fig. 2, so as to align the spur gear 87d of registering wheel 86d of the second registering device D in the subsidiary accumulator unit C, D with the intermediate wheel 80'. Now, the principal accumulator A cooperates with the registering device D of the subsidiary accumulator. The slide 96 is shifted so that its hole 97 exposes the registering wheel 86d. This position of the hole is marked with a "—" sign, as the operation now to be performed, is subtraction, and the numerals on the wheel 86d are arranged in opposite sequence to those on the wheels 86 and 86c. The amount from which the products are to be subtracted, is run in at A and the products are taken by operating D through backward rotation of shaft 15. After the taking of every product, D is zeroized. Every product is subtracted from the amount run in upon A immediately upon the product being taken at D.

3. If it is desired to operate the machine like a normal calculating machine, i. e. without the subsidiary accumulator C, D, the shafts 78' and 79' as well as the slide 96 are shifted as shown in Fig. 3, so as to move the wheel 80' altogether clear of the teeth 17 of the calculating wheel 16. This avoids unnecessary entraining of the subsidiary accumulator C, D when it is not required.

4. If it is desired to obtain a total by adding certain products, or items, and by subtracting others, the principal accumulator A cooperates with both registering devices C and D in the subsidiary accumulator. The positive products or items are run in upon C by forward rotation of shaft 15, and are not cleared. Similarly, the negative products are run in upon D by backward rotation of shaft 15, and not cleared. At the end of the operation, C indicates the total of all positive products or items, say, amounts received, and D indicates the total of all negative products or items, say, amounts spent. The balance is read at A.

We wish it to be understood that we do not desire to be limited to the exact details of construction shown and described for obvious modifications will occur to a person skilled in the art.

We claim:—

1. A calculating unit for calculating machines, comprising a calculating wheel provided with adjustable teeth and fixed on a rotatable shaft, a principal accumulator, including two shafts arranged in parallel relation to said rotatable shaft, a registering wheel rotatably mounted on one of said two shafts, a stop at one side and a spur gear at the other side of said registering wheel, an intermediate spur gear rotatably mounted on the second of said two shafts and cooperating with said spur gear on said registering wheel and with the teeth of said calculating wheel, and a tens transfer lever arranged on the second of said two shafts in line with said stop on said registering wheel, and a subsidiary accumulator, comprising two shiftable shafts arranged in parallel relation to said other shafts, a pair of registering wheels mounted to independently rotate on and to partake in the shifting movements of one of said shiftable shafts, a spur gear connected to each of said registering wheels at the sides facing each other, a stop on each of said registering wheels, a second intermediate gear mounted to rotate on and to partake in the shifting movements of the second of said shiftable shafts and a tens transfer lever of U-shaped cross section, also mounted on and partaking in the shifting movements of the second of said shiftable shafts, one of the registering wheels in said subsidiary accumulator being numbered in the same sequence as the registering wheel in said principal accumulator and the other being numbered in the opposite sequence, and the arrangement being such, that by shifting the first of said shiftable shafts the spur gears on the registering wheels of said subsidiary accumulator may selectively be engaged with and disengaged from the intermediate spur gear on said second shiftable shaft and simultaneously the shanks of the tens transfer lever of U-shaped cross section on this shaft may selectively be brought in and out of the path of the corresponding projections on said registering wheels, while by shifting the second of said shiftable shafts, said intermediate spur gear in said subsidiary accumulator may be selectively brought in and out of engagement with the teeth of said calculating wheel.

2. A calculating unit for calculating machines, comprising a calculating wheel provided with adjustable teeth and fixed on a rotatable shaft, a principal accumulator and a subsidiary accumulator, each including two shiftable shafts arranged in parallel relation to said rotatable shaft, a pair of registering wheels mounted to independently rotate on and to partake in the shifting movements of one of said shiftable shafts, a spur gear connected to each of said registering wheels at the sides facing each other, a stop on each of said registering wheels, an intermediate gear mounted to rotate on and to partake in the shifting movements of the second of said shiftable shafts and a tens transfer lever of U-shaped cross section, also mounted on and partaking in the shifting movements of the second of said shiftable shafts, the wheels of the two pairs of registering wheels in the two accumulators being numbered in opposite sequence and those having the same sequence of numerals being arranged in line with each other in the two accumulators, and the arrangement being such, that in each of said accumulators by shifting the first of said shiftable shafts the spur gears on the registering wheels may selectively be engaged with and disengaged from said intermediate spur gear and simultaneously the shanks of the tens transfer lever on the shaft carrying said intermediate spur gear may selectively be brought in and out of the path of the corresponding projections on said registering wheels, while by shifting the second of said shiftable shafts, said intermediate spur gear may be selectively brought in and out of engagement with the teeth of said calculating wheel.

ERNST MODES.
RICHARD HONZ.
OTTO HENNIG.